May 15, 1923.

T. MIDGLEY

TIRE MANUFACTURE

Filed June 4, 1919  5 Sheets-Sheet 1

1,455,260

INVENTOR
Thomas Midgley.
BY
Chapin & Neal
ATTORNEY

May 15, 1923.

T. MIDGLEY

TIRE MANUFACTURE

Filed June 4, 1919

INVENTOR
Thomas Midgley
BY Chapin & Real
ATTORNEY

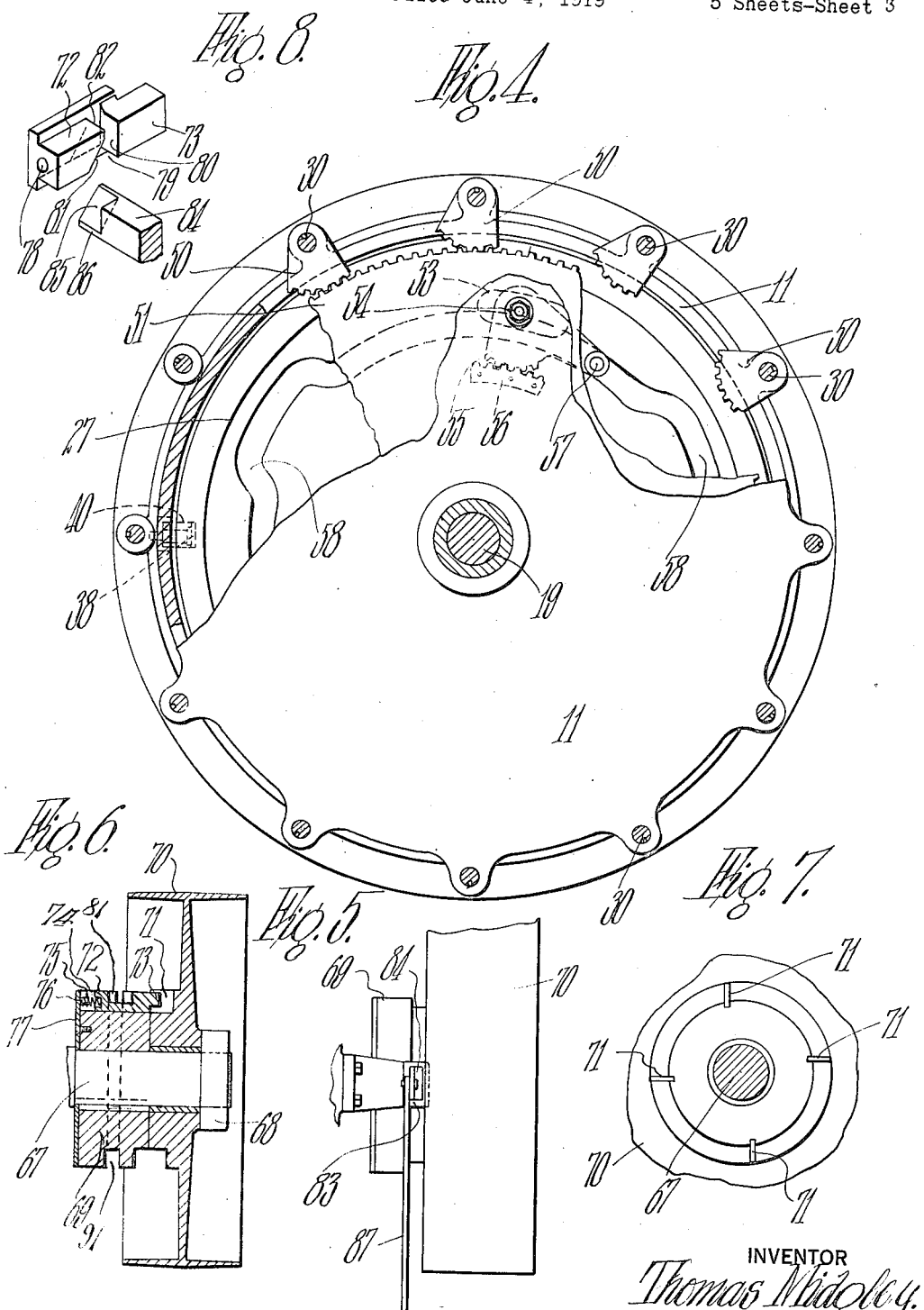

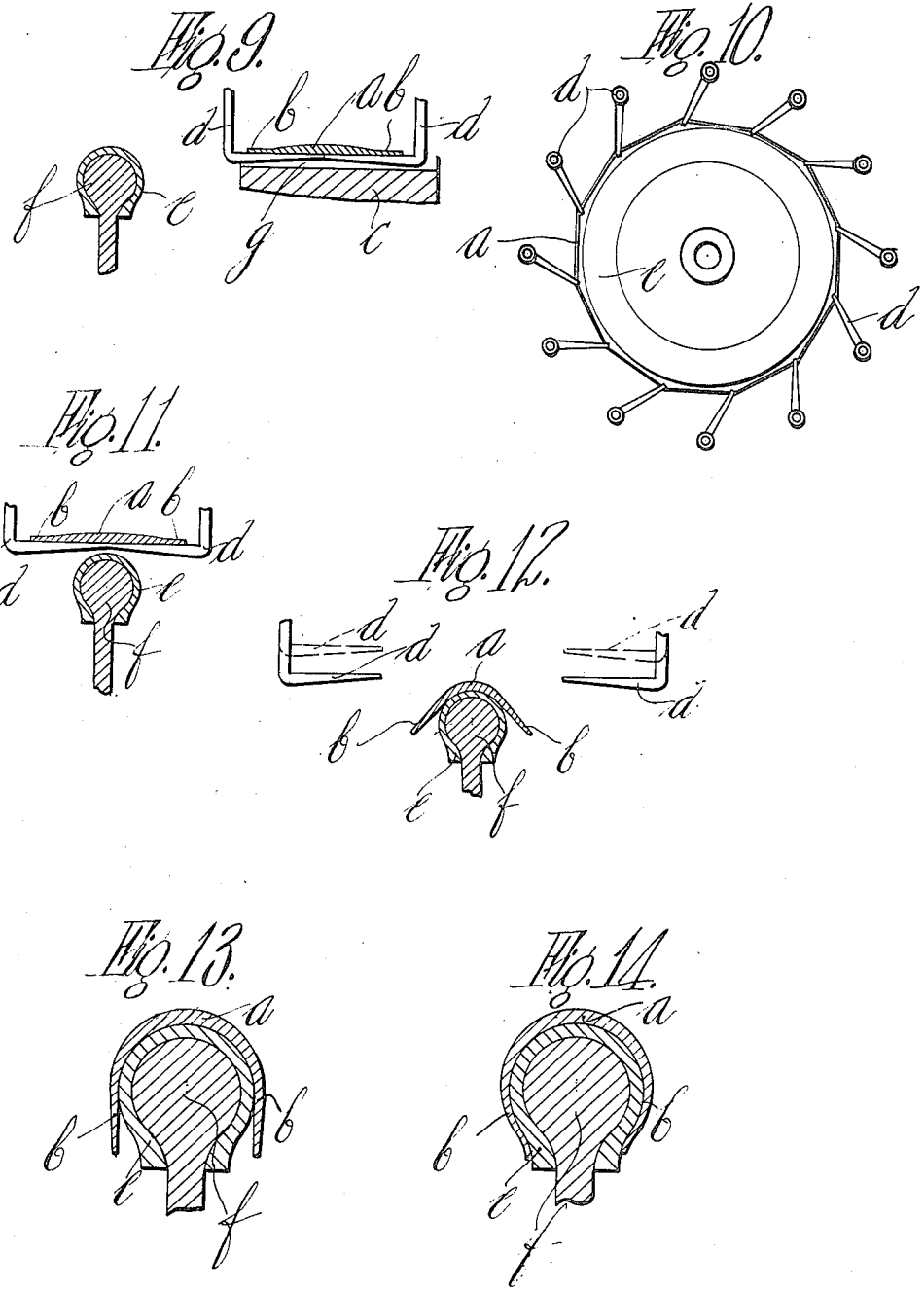

May 15, 1923.
T. MIDGLEY
1,455,260
TIRE MANUFACTURE
Filed June 4, 1919
5 Sheets-Sheet 5
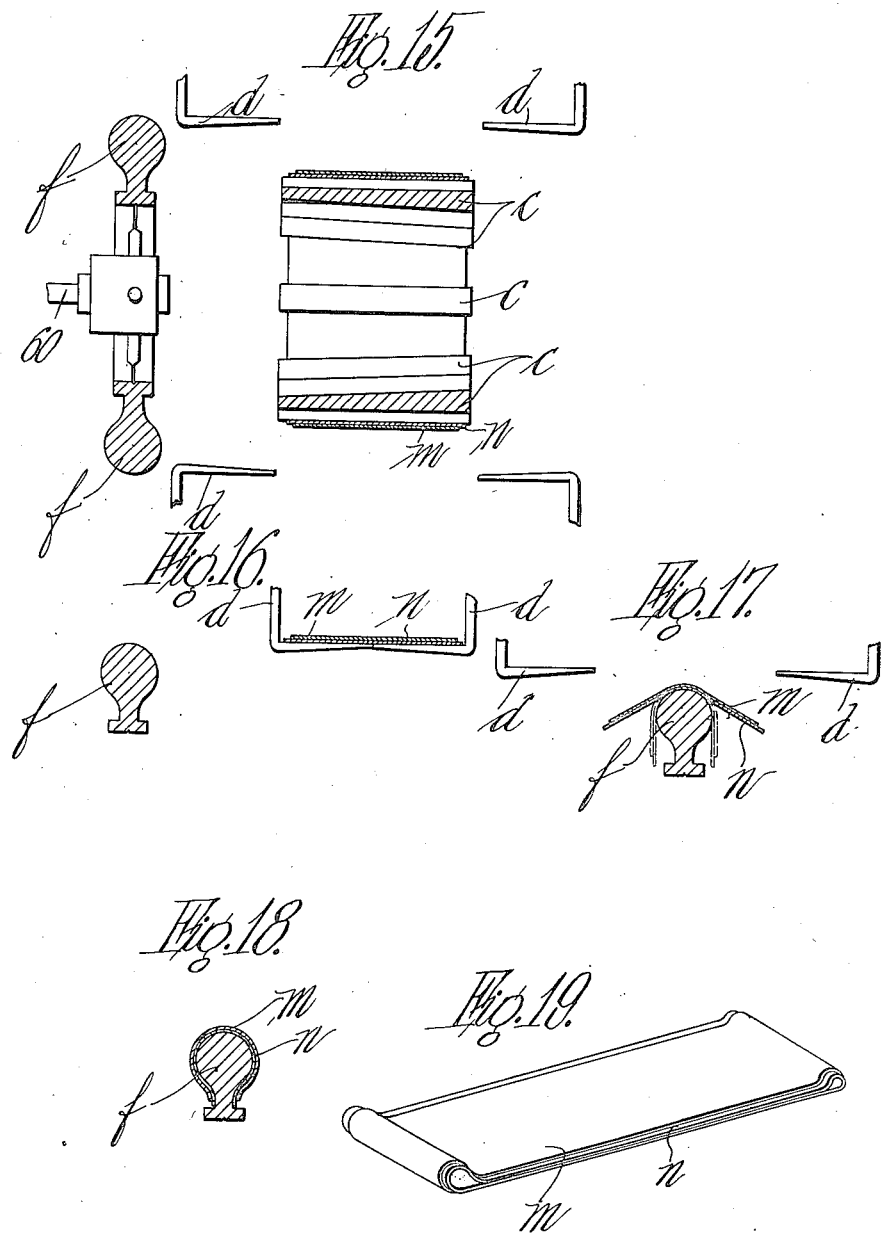
INVENTOR
Thomas Midgley.
BY
ATTORNEYS.

Patented May 15, 1923.

1,455,260

UNITED STATES PATENT OFFICE.

THOMAS MIDGLEY, OF SPRINGFIELD, MASSACHUSETTS, ASSIGNOR TO FISK RUBBER COMPANY, OF CHICOPEE FALLS, MASSACHUSETTS, A CORPORATION OF MASSACHUSETTS.

TIRE MANUFACTURE.

Application filed June 4, 1919. Serial No. 301,732.

*To all whom it may concern:*

Be it known that I, THOMAS MIDGLEY, a citizen of the United States of America, residing at Springfield, in the county of Hampden and State of Massachusetts, have invented certain new and useful Improvements in Tire Manufacture, of which the following is a specification.

My invention relates to the assembling of tire building material on ring cores, and has for its object the reduction of the labor necessary, and the better positioning of the material as to location and internal conditions of stress and tension, as well as other objects which will appear from the description and claims.

To these ends I have provided a method and a machine for performing it which I will now describe. In carrying out the method the tire building material is formed into endless bands of circumferences sufficiently less than that of the ring core at its crest to provide for the desired amount of stretch. These endless bands, which may be composed of one or more plies of the rubberized fabric or cord carcass-building material, or of the tread rubber, or tread and side walls, or other building elements, are now severally expanded to a circumference enough greater than that of the core so that each band may be freely positioned around the core. According to one feature of my invention each band is positioned in encircling relation to the core by two opposed series of supports which are separable axially so that the center of the band will be released upon the core before the sides. This permits the center of the band to adhere to the crest of the core and maintain the band in position during the releasing of the sides. The sides then may be released substantially simultaneously by further separating the opposed series of supports, and will then, due to the elasticity of the rubber component of the band, contract down the sides of the core under uniform and balanced conditions. According to another feature of my invention the band is positioned in encircling relation to the core in the form of a polygonal prism of sufficient size to encircle the core and is held in polygonal form by the opposed series of supports previously referred to, the supports being located at the corners of the polygon. After the band is positioned about the core the supports are moved radially inwardly to permit the contraction of the band so that the chordal portions of the band will contact with the core. The two series of supports may then be axially separated to cause the band to be released as above described, this method furnishing additional insurance against unequal conditions of tension or position as the band contracts.

In some instances it will be sufficient to form the endless band of a circumference substantially that of the median line of the side of the core, this giving substantially the stretch customarily employed. In other instances, as where the tread and sidewalls are being applied as a unit, or where it is desired to cause the material to stretch down the sides of the core substantially parallel to the plane thereof, the band may be formed of an original circumference substantially that of the base of the core. In either case the elasticity of the band, due to the elasticity of the rubber of which it is composed in case of the tread or with which it is impregnated in case of fabric, will cause the band to tend to assume its original diameter after it has been stretched, and thereby to cling tightly around the core, or previously laid material thereon, after it is released.

The method when applied to the building of a tire carcass out of bands of cord or fabric material presents particular utility. By releasing the band evenly from both sides even conditions of lateral position and stretch are insured, and injurious misplacing of the strain-resisting members avoided. The center of the band holds the band from lateral shifting after it is released upon the core, and the subsequent simultaneous releasing of the sides will permit them to contract under even and uniform conditions.

These methods may be carried out by any suitable apparatus, but I have illustrated the form which I prefer in the accompanying drawings in which—

Fig. 4 is an end view of parts shown at the right in Fig. 1 substantially on line 4—4 thereof, but with some parts broken away to show the mechanism for rotating the carrying fingers;

Figure 1:
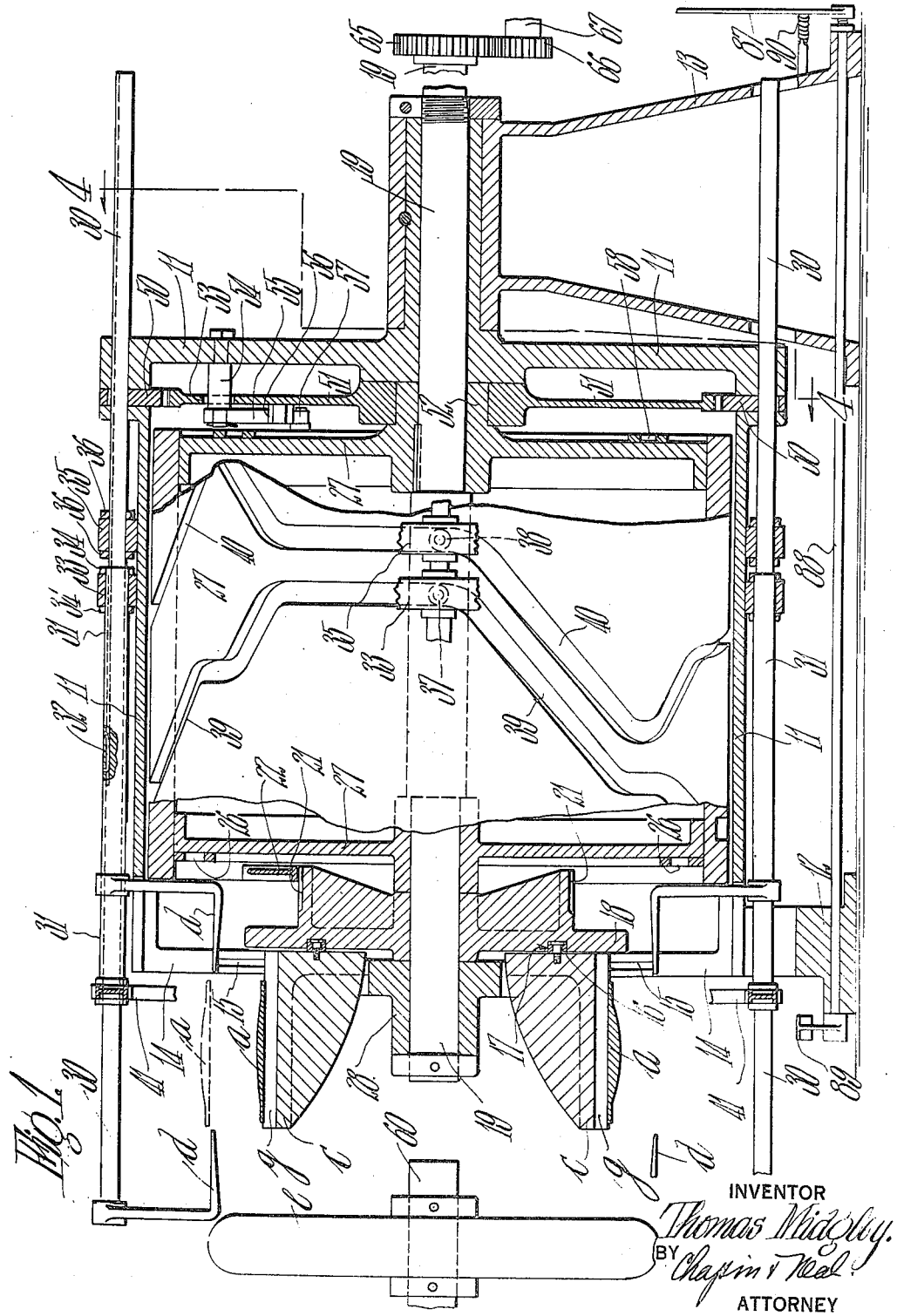
Fig. 1 is a vertical longitudinal section showing a portion of the cam drum in full and showing a core in place ready to receive the expanded band.

Fig. 5 is a detail of a clutch mechanism;

Fig. 6 is a longitudinal section thereof;

Fig. 7 is an end view of one of the clutch members;

Fig. 8 is a perspective view showing the action of some elements of the clutch;

Figs. 9 to 14 are details showing steps in the application of a tread to a tire carcass;

Figs. 15 to 18 are details showing steps in the application of fabric layers to a core in the building up of a carcass; and Fig. 19 is a perspective view of an endless band of fabric which is to be used in building up a tire carcass.

The manner in which the machine operates in the application of a tread to a carcass is, in general, as follows. (See Figs. 1 and 9 to 14.) The tread $a$, shown in the drawings with side walls $b$ made integral therewith, but referred to for brevity as the tread, is placed upon a series of radially movable expander fingers $c$. These fingers are located as a circular series, and, at this stage, define a circle having a diameter substantially equal to that of the carcass at the point where lower edges of the side walls are to be, i. e., at a point just above the beads (see Fig. 1). The fingers are then expanded to a position in which they define a circle slightly greater in diameter than that of the carcass at its crest or point of maximum diameter. This stretches the tread into the position shown in Fig. 9 and in dotted lines in Fig. 1. The tread is grasped at this position by carrying fingers $d$, which are rotated slightly (Fig. 10) to enable the portion of the tread which lies in straight lines between the fingers to clear the carcass $e$, mounted on a core $f$, and is brought to the position illustrated in Fig. 11, where the fingers hold the tread in position exactly over the center of the carcass. The fingers are then rotated towards the carcass until the straight or chord-like portions of the stretched tread contact with the carcass, when the tacky rubber of the tread will firmly adhere to the carcass. The fingers are then separated, as shown in full lines in Fig. 12, the engagement of the carcass and tread holding the latter in position. By the axial separation of the two sets of carrying fingers $d$ the center of the band will be released first, and the sides thereafter. This insures that the band will be properly positioned, as the center of the band will be permitted to adhere to the core before the fingers release the sides. The axial separation of the two opposed sets of fingers is also of advantage in equalizing the frictional drag exerted by the fingers on the band and avoiding displacement of the band due to this cause. As soon as it is released the tread starts to retract to its original diameter, but, as it is restrained at its central portion by the carcass, it will assume a position like that shown in Fig. 12. The fingers, meanwhile are rotated to a position shown in dotted lines in this figure, and move back to a position in which they are in readiness to receive another tread from the expander fingers. If given sufficient time, the side walls will shrink to a position such as is illustrated in Fig. 13, provided the original diameter of the band was less than that of the inner edges of the side walls as shown in this figure, but this will usually take more time than is convenient to give, and it is preferable to spin or "stitch" the side walls down onto the carcass into a final posititon such as shown in Fig. 14 before the position of Fig. 13 has been reached.

The operation of the device in applying the bands or pockets of rubberized fabric to a core is very similar. A band of fabric is shown in Fig. 19 as composed of two plies $m$ and $n$, preferably of bias cut rubberized fabric, which may be either square woven fabric, cord fabric, thread fabric, or other suitable material. The band is opened out and placed on the expander fingers $c$, as shown in Fig 15, the latter are moved radially outwardly and the band is taken by fingers $d$ exactly as in the case of the tread. The position of the band and core at this stage is illustrated in Fig. 16. The movement of the carrying fingers in positioning and releasing the band about the core is the same as described above, the released band assuming a position between the full and dotted positions shown in Fig. 17 depending on the size from which the band was expanded. The final posititon of the band as it is stitched or spun in place on the core is illustrated in Fig. 18. If more than the number of plies conveniently assembled in a single band are desired, a second band may be prepared, expanded, and located about the partially built carcass.

In the description and claims to follow mention will be made of a band being expanded and located upon a core; but it will be understood that the term band includes either a tread (with side walls and breaker if desired) or a pocket of fabric which is to be built into a carcass, and that the term core is inclusive of a partially or completely built carcass.

Figure 3:
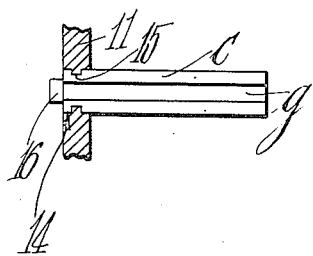
Fig. 3 is a detail showing the mounting of the expander fingers.

Coming now to a detailed description of the mechanism, the operating parts are mounted on a large stationary drum 11, secured to brackets 12 and 13. In one head of this drum are radial slots 14, provided through a part of their length with tongues 15. In each of these slots one of the expander fingers $c$ is fitted to slide, the fingers being grooved to receive the tongues, as shown in Fig. 3. The slots also serve to permit of the passage of the carrying fingers $d$, to be described later.

Figure 2:
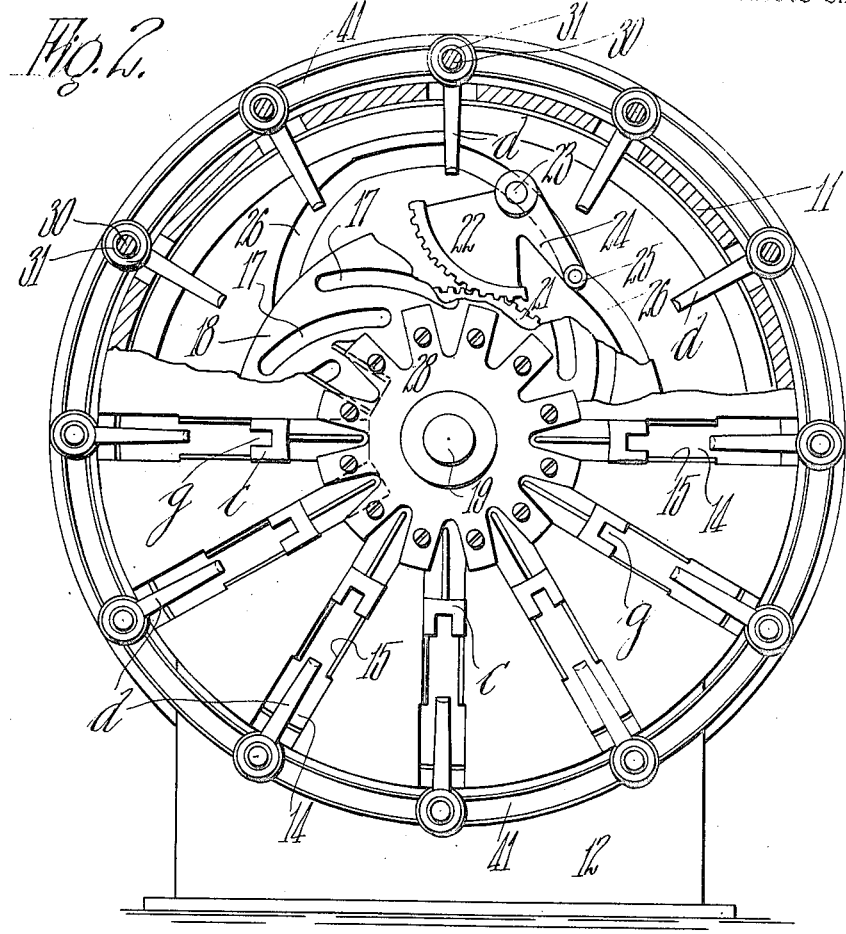
Fig. 2 is an end view of the parts at the left in Fig. 1, a portion of the mechanism being broken away to show various cams.

In order to move the expander fingers radially, each finger has a cam roll 16 thereon running in a slot 17 on a plate 18. There is one slot for each of the fingers, as shown in Fig. 2. Plate 18 is freely mounted on a shaft 19 journalled in the heads of drum 11, and rotatable by any desired means, as by a half revolution clutch to be described, to actuate certain cams controlling various parts of the mechanism. Plate 18 is provided with a hub having gear teeth 21 therein, the latter meshing with a segment 22 pivoted at 23 to the head of drum 11. This segment has an arm 24 thereon, carrying a cam roll 25 which runs in a groove 26 on one head of a cam drum 27. The drum is carried by and is keyed to shaft 19, and the groove may be formed on the head thereof in any desired way, as by securing to the head parallel pieces of strap iron, or by cutting a slot in the material of the head itself. By the rotation of the cam drum 27 segment 22 will be rocked, plate 18 will be given an oscillatory motion because of the coaction of the segment with gear teeth 21, and cam slots 17 will force the expander fingers radially outwardly and inwardly. The cam track is so designed that a complete cycle is completed in one half a revolution of the cam drum. Preferably a spider 28 is freely mounted on shaft 19 and is secured to the head of drum 11 to assist in giving bearing surface and in keeping the parts in their proper positions.

The carrying fingers $d$ receive a compound motion; comprising an axial reciprocation whereby they receive the expanded tread, carry it to the carcass, separate so as to free themselves from the carcass, and withdraw from the carcass to their original position; and a motion of oscillation about their several supports, whereby they are moved to clear the carcass on their travel towards and from it and are moved to assist in depositing the tread easily and accurately in place. The fingers $d$ most removed from the drum 11 are carried on rods 30, and the fingers nearest the drum are carried on sleeves 31, which surround the rods and furnish bearings therefor. The rods and sleeves are keyed together as at 32, so that they may slide relative to each other but are constrained to rotate together.

The mechanism for reciprocating the carrying fingers will now be described. Sleeves 31 have a ring 33 secured thereto, as by collars 34, so that while the sleeves may rotate freely relative to the ring, any axial movement of the ring will cause a corresponding movement of all the sleeves. Rods 30 have a similar ring 35 secured in like manner thereto by means of collars 36. Rings 33 and 35 are provided with cam rolls 37 and 38 respectively, the rolls running in cam tracks 39 and 40 on the periphery of the cam drum 27. Preferably, although not apparent from the drawing, a roll is provided at diametrically opposite portions of each ring, to prevent binding of the rings when they are moved. The shape of these cam tracks is such as to give to the fingers a series of reciprocating movements which will be later described, a half revolution of the cam drum being sufficient to cause one cycle in the motion of the various elements. A ring 41 is preferably attached to the outer ends of sleeves 31, in order to give a firm support for the finger-carrying ends of rods 30.

In order to oscillate the fingers each rod 30 has keyed thereto a segmental gear 50, turning in a bearing in drum 11 and meshing with a large gear 51 which is free to rotate about a hub 52 of cam drum 27. Gear 51 has a slot 53 therein to accommodate the pivot 54 of a segmental gear 55, carried on one end of drum 11, and meshing with a short gear 56 secured to gear 51. The segmental gear 55 has an arm carrying a cam roll 57, running in a track 58 in the end of cam drum 27 opposite from slot 26. As the cam drum rotates, the segmental gear 55 will be rocked by the cam track and roller and will in turn cause oscillatory motions of large gear 51, which actuates all the segmental gears 50. A complete cycle in the motion of the fingers is completed during one half a revolution of the cam drum. As sleeves 31 are slidingly keyed to rods 30, oscillatory motion of the latter will cause the sleeves to oscillate in unison therewith. The core $f$ which supports the carcass $e$ may be mounted in any convenient manner, as on a shaft 60.

As previously mentioned, the cams 26, 39, 40 and 58 are designed to give a complete cycle of the parts operated thereby during a half revolution of the cams. This is desirable due to the provision of two opposed cam rolls on rings 33 and 35, necessitating exact similarity in the shape of the cam grooves on diametrically opposite points of the drum. It is further desirable that the machine shall start from the position of Fig. 1 and execute a complete cycle, stopping again automatically in this position and remaining stationary as long as desired by the operator, to enable the latter to mount another band in place. In order to secure these results a clutch mechanism is preferably provided, one form of which is illustrated in Figs. 1 and 5 to 8 inclusive, and which is constructed as follows.

Shaft 19 is provided with a gear 65 meshing with a pinion 66 on a shaft 67 (see Fig. 1). The relation between the gear and pinion is such that one revolution of the former is effected by two of the latter. Mounted loosely upon shaft 67 and freely rotatable between a collar 68 and a hub 69 which is keyed to shaft 67, is a pulley 70. This pulley is provided with one or more flanges or lugs 71, shown in the drawings as four in number, although the exact number is immaterial. Carried by hub 69 is a dog 72 having a projection 73 adapted to be engaged by one of the lugs 71. The dog is dovetailed to slide in a groove 74 in the hub, and is pressed towards the pulley 70 by a spring 75. Spring 75 may be conveniently mounted on a pin 76 projecting from a plate 77 secured to the hub, and may seat in a hole 78 in the dog. The dog has in the outer surface thereof a cam way 79 of which one side 80 is straight and the other side is beveled as at 81 for a portion of its width and flat as at 82 for the remainder. Slidable in a guide 83 attached to any suitable part of the frame is a bar 84 having on its end a beveled portion 85 adapted to coact with the beveled portion 81 of the dog, and a flat portion 86 adapted to coact with the flat portion 82 of the dog. The bar 84 is withdrawn from the path of the dog by an arm 87 pivoted thereto and carried on a shaft 88 which may be rocked by a treadle 89. The arm 87 is returned to push the bar into the path of the dog by a spring 90, conveniently mounted on the frame of the machine. A slot 91 in the hub permits bar 84 moving into the path of the dog.

The operation of the clutch is as follows. Assume that the treadle has just been depressed to withdraw bar 84 from engagement with the dog. The dog is now free to slide towards the pulley under the influence of the spring 75, and will be engaged by the lug 71 which is next to come by, it being understood that pulley 70 is continuously rotated as by a belt from any suitable source of power. As the pulley continues to rotate it will carry dog 72 with it, consequently rotating hub 69, shaft 67, and, through the gearing 65, 66 and shaft 19. This motion will continue until the dog has made one complete revolution, when it again comes within range of bar 84, treadle 89 having in the meantime been released to allow the bar to move inwardly. As the dog approaches the bar the beveled surfaces 81 and 85 will contact, and, as the dog is moved further, it will gradually be withdrawn from contact with lug 71. At the moment when the dog separates entirely from the lug flat portions 82 and 86 of the dog and bar come together, thus holding the dog disengaged from the lug until the operator sees fit to depress the treadle and allow the dog to snap inwardly. It will be remembered that the complete revolution on shaft 67 obtained by this mechanism will cause a half revolution of shaft 19 and the cam drum, carrying the various mechanisms through one complete cycle and stopping them until the operator is ready to expand a new tread or band of fabric.

The operation of the device will now be described. A tread $a$ with or without side walls $b$, or a band of fabric $mn$ is placed in the form of an endless band on expander fingers $c$, while the machine is held inactive by the clutch mechanism described. Treadle 89 is then depressed and shortly thereafter released, rotating the shaft 19 and causing the following sequence of operations to take place. The expander fingers are first moved radially outwardly, stretching the band until it is in the position shown in Figs. 9 and 16 or in dotted lines in Fig. 1. During this stretching operation fingers $d$ are held separated, as shown in Fig. 1, and extend radially, as shown in Fig. 2. When the expander fingers have reached their expanded position they remain stationary, and the carrier fingers move together, or from the position of Fig. 1 to that of Figs. 9 and 16. Slots $g$ in the outer surface of the expander fingers permit this. The expander fingers now retract, leaving the band supported by the carrier fingers, and these then move together towards the core, which is supported in the position shown in Figs. 1, 9 and 15. As the carrier fingers travel towards the core they are slightly rotated, as shown in Fig. 10, thereby very slightly expanding the band further, so that the straight portions of the band between the fingers will clear the crest of the core. After the carrying fingers have brought the band to a central position over the core they are slightly rotated in the opposite direction. This rotation brings the straight portions of the band down onto the crest of the core and allow the band and core to adhere. The fingers are then moved away from each other as shown in Figs. 12 and 17. When the fingers are separated sufficiently to release the band they are again rotated, this time in a direction to move fingers into a position where those fingers on the outside of the core will clear it and the band positioned thereon when, in the next step of the operation, the two sets of carrying fingers are moved together to their original position. The rotated position of the bands is shown in dotted lines in Fig. 12. As soon as the fingers are clear of the carcass they are rotated to bring them into radial position, they then being in readiness to take the next band expanded by the expander fingers.

The exact sequence of operations is determined by the shape given to the cam grooves, and it is not essential that in all its details it should be as described here. The essential features of the machine are the expansion of the rubber tread, its location adjacent to the carcass, and its release from that position to permit it to contract about the carcass. Preferably this is accomplished by two sets of fingers (the expander fingers and the carrier fingers), but by giving a slightly greater motion to the carrier fingers they may be made to perform both functions; or they may merely expand the tread, a core carrying a carcass being slipped under the expander tread, which is then released.

It will be seen from the above description that the machine will accurately position the band, whether it be a tread or a fabric pocket, in position on the core, without the skill and labor necessary under the former procedure. It will also be seen that the band is under a considerable tension, and that in shrinking it will be brought progressively into intimate contact with the core or carcass, thereby thoroughly forcing out the entrapped air. The pressure exerted by the rubber as it shrinks will also cause the tread to adhere firmly to the carcass, or the several fabric pockets to adhere firmly to each other.

I realize, of course, that many changes may be made in the specific embodiment shown without departing from my invention, some such possible changes being pointed out above; and I do not deem myself limited to the structure shown except as is set forth in the appended claims.

I claim—

1. In a device for applying extensible bands to cores in the manufacture of tire casings, means for supporting a core, means for stretching an endless band from a circumference less than to a circumference greater than that of the core at its crest, means for removing the stretched band from the stretching means and carrying it to a position encircling the core, and means for releasing the band from the carrier so that it may contract upon the core.

2. In a device for applying extensible bands to cores in the manufacture of tire casings, means for supporting a core, means for stretching an endless band from a circumference less than to a circumference greater than that of the core at its crest, a plurality of carrier fingers arranged in two circular series, means for moving the two series toward each other to receive the stretched band from the stretching means, means to move the two series simultaneously to carry the stretched band to a position encircling the core, and means to separate the two series so that the band is released to contract upon the core.

3. In a device for applying extensible bands to cores in the manufacture of tire casings, means for supporting a core, means for stretching an endless band from a circumference less than to a circumference greater than that of the core at its crest, two circular series of opposed fingers, means for moving the two series towards each other to receive the stretched band, means to simultaneously expand the two series to give a slight additional stretch to the band, means to simultaneously move the two series axially to carry the stretched band to a position encircling the core, and means to contract the two series and to move them away from each other to free them from the band and to allow the latter to contract upon the core.

4. In a device for applying extensible bands to cores in the manufacture of tire casings, a plurality of L-shaped fingers adapted to receive an endless band, and means to rotate the fingers about their individual axes to stretch the band.

5. In a device for applying extensible bands to cores in the manufacture of tire casings, means for supporting a core, a plurality of L-shaped fingers adapted to receive an endless band, means to rotate the fingers about their individual axes to stretch the band, and means to release the band so that it may contract upon the carcass.

6. In a device for applying extensible bands to cores in the manufacture of tire casings, means for supporting a core, a plurality of L-shaped fingers adapted to receive an endless band, means to rotate the fingers about their individual axes to stretch the band, means to reciprocate the fingers to locate the stretched band in a position encircling the core, and means to give to the fingers motions of reciprocation and rotation, whereby the band is allowed to contract upon the core and the fingers are withdrawn from contact with the band.

7. In a device for applying extensible bands to cores in the manufacture of tire casings, means for supporting a core, a plurality of radially movable fingers adapted to receive an endless band, means to move the fingers to stretch the band, and means to remove the stretched band from the fingers and carry it to a position encircling the core.

8. In a device for applying extensible bands to cores in the manufacture of tire casings, a plurality of radially movable fingers adapted to receive an endless band and having grooves in their outer faces, means to move said fingers to stretch the band, and a plurality of fingers adapted to enter said grooves and remove the stretched band from the first-named fingers.

9. In a device for applying extensible bands to cores in the manufacture of tire casings, means for supporting a core, a circular series of radially movable fingers adapted to receive an endless band, means to move said fingers to stretch the band, a second circular series of fingers, and means to move said second series of fingers to remove the stretched band from the first named fingers and carry it to a position encircling the core.

10. In a device for applying extensible bands to cores in the manufacture of tire casings, means for supporting a core, a series of radially movable fingers adapted to receive an endless band, means to move said fingers to stretch the band; a second series of fingers; and means to move said second series of fingers to remove the stretched band from the first named series, give it a slight additional stretch, and deposit it upon the carcass.

11. In a device of the character described, a circular series of radially movable fingers, an oscillatory cam plate having cams thereon for moving the fingers radially, and means for oscillating the cam plate.

12. In a device of the character described, a circular series of radially movable fingers, an oscillatory cam plate having cams thereon for moving the fingers radially, a gear attached to the cam plate, a rotatable cam drum, a segment engaging the cam plate and engaged by the cam drum, and means to rotate the cam drum, whereby the segment is oscillated to cause oscillation of the cam plate and radial movement of the fingers.

13. In a device of the character described, two opposed circular series of L-shaped fingers, means to cause simultaneous rotation of the fingers of the two series about their individual axes, and means to move each of the series axially independently of the other series.

14. In a device of the character described, two opposed circular series of L-shaped fingers having the individual pivots of the fingers of one series passing axially through the pivots of the other series and being slidingly keyed thereto, rings connecting the pivots of each series so that the pivots of each series are constrained to move axially as a unit, but are free to rotate individually, means for moving the rings axially and independently of each other, and means for simultaneously rotating the fingers of both series about their individual axes.

15. In a device of the character described, two opposed circular series of L-shaped fingers having the individual pivots of the fingers of one series passing axially through the pivots of the other series and being slidingly keyed thereto, means for moving each series axially independently of the other series, and means for causing simultaneous rotation of the fingers of both series about their individual axes.

16. In a device of the character described, two opposed circular series of L-shaped fingers having the individual pivots of the fingers of one series passing axially through the pivots of the other series and being slidingly keyed thereto, means for moving each series axially independently of the other series, a segmental gear mounted upon each of the pivots of one series, a gear engaging all of the segmental gears, and means for causing oscillation of the gear.

17. In a device of the character described; a circular series of radially movable fingers; two opposed circular series of L-shaped fingers; a rotatable cam drum carrying a cam for moving the two series of L-shaped fingers axially independently of each other, a cam for rotating the fingers of said two series about their individual axes, and a cam for moving the fingers of the first named circular series radially; and a clutch constructed and arranged to rotate the cam drum through one cycle of the operated parts and to stop said drum when the cycle is complete.

18. A device for depositing an expanded band of tire building material on a core, comprising opposed series of supports, and means to separate the supports in an axial direction to release the center of the band and then the sides upon the core.

19. In a device of the character described, means for supporting a core, an expanding device spaced from the core in the direction of its axis and constructed and arranged to expand an endless band to a circumference greater than that of the core at its crest, and means for removing the expanded band from the expanding device and depositing it upon the core.

20. In a device of the character described; means for supporting a core; an expanding device spaced from the core in the direction of the axis and constructed and arranged to expand an endless band to a circumference greater than that of the core at its crest; and means for removing the expanded band from the expanding device, transporting it towards the core substantially parallel with the axis thereof, and depositing it upon the core.

21. In a device of the character described, means for supporting a core, means for expanding an endless band into the form of a polygon, means for removing said expanded band from the expanding means and positioning it about the core, means for allowing the band to contract until the portions of the band forming the sides of the polygon are in contact with the core, and means for withdrawing the positioning means and allowing the band to contract upon the core.

22. In a device of the class described, means for positioning a band about a core comprising opposed series of supports adapted to hold the band in the form of a polygon, means for contracting said supports so as to bring the chordal portions of the polygon into contact with the core, and means for separating the opposed series of supports to release the remainder of the band upon the core.

23. In a device of the class described, means for expanding a band, and means for removing the band from the expanding means and depositing it upon a core.

24. In a device of the class described, means comprising a series of radially movable supports for expanding a band, and means for removing the band from said supports and depositing it upon a core.

25. In a device of the class described, means for expanding a band comprising a series of supports having grooves therein, and means comprising a series of members adapted to enter into said grooves for removing the band from the expanding means and depositing it upon a core.

26. In a device of the class described, means for expanding a band, and means for removing the band from the expanding means and depositing it upon a core comprising opposed supports constructed and arranged to move together to underlie the expanded band and to remove it from the expanding means, and to separate to release the band upon a core.

27. In a device of the class described, means for expanding a band, and means for removing the band from the expanding means and depositing it upon a core, said last-named means being constructed and arranged to give additional expansion to the band after it has been removed from the expanding means.

28. In a device of the class described, a core, a support for the core, and means for positioning a band of fabric upon the core constructed and arranged to release the center of the bands before the sides.

29. The method of placing an extensible band on a core in the manufacture of an annular tire casing, comprising; forming the band of a circumference less than that of the core at its crest, expanding the band to a circumference greater than that of the core, positioning the expanded band about the core, releasing the central portion of the band so that it may contract upon the core, and subsequently releasing the sides of the band so that they may contract upon the core.

30. The method of placing rubberized fabric upon a building core under uniform tension conditions in the manufacture of the carcass of an annular tire casing, comprising; forming an endless band of rubberized fabric of less circumference than that of the core at its crest, expanding the band to a circumference greater than that of the core under conditions giving the band substantially even longitudinal tension, positioning the expanded band about the core, releasing the central portion of the band so that the fabric may adhere to the crest of the core, and subsequently releasing the two side portions of the core substantially simultaneously so that they may contract upon the core under substantially uniform conditions of lateral tension.

31. The method of building an annular tire casing on a ring core, including: forming elastic tire building material into an endless band of a circumference substantially that of the base of the ring core, expanding the band to a circumference greater than that of the core at its crest, positioning the band about the core, permitting the band to contract upon the core, whereby the side portions of the band will extend inwardly along the sides of the core substantially parallel to the plane thereof, and then conforming such material to the sides of the core.

THOMAS MIDGLEY.